US010462825B2

(12) United States Patent
Shailendra et al.

(10) Patent No.: US 10,462,825 B2
(45) Date of Patent: Oct. 29, 2019

(54) SYSTEMS AND METHODS FOR DELAY BASED POWER RAMPING OF DEVICES

(71) Applicant: Tata Consultancy Services Limited, Mumbai (IN)

(72) Inventors: Samar Shailendra, Bengaluru (IN); Aniruddh Rao Kabbinale, Bengaluru (IN); Bighnaraj Panigrahi, Bengaluru (IN); Hemant Kumar Rath, Bengaluru (IN); Anantha Simha, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 15/792,034

(22) Filed: Oct. 24, 2017

(65) Prior Publication Data
US 2018/0255587 A1 Sep. 6, 2018

(30) Foreign Application Priority Data
Mar. 6, 2017 (IN) .............................. 201721007813

(51) Int. Cl.
*H04W 74/08* (2009.01)
*H04W 52/48* (2009.01)
(Continued)

(52) U.S. Cl.
CPC ....... *H04W 74/0833* (2013.01); *H04W 52/32* (2013.01); *H04W 52/48* (2013.01);
(Continued)

(58) Field of Classification Search
CPC ......... H04W 74/0833; H04W 72/0446; H04W 52/32; H04W 88/08
(Continued)

(56) References Cited

U.S. PATENT DOCUMENTS

2008/0268893 A1\* 10/2008 Lee .................. H04W 52/146
455/522
2010/0041428 A1 2/2010 Chen et al.
(Continued)

FOREIGN PATENT DOCUMENTS

| EP | 2145493 | 1/2010 |
|---|---|---|
| JP | 2015-505211 | 2/2015 |
| WO | WO-2014/069944 | 5/2014 |

OTHER PUBLICATIONS

5G Americas, (Dec. 2016). "LTE and 5G Technologies Enabling the Internet of Things," *5G Americas*; pp. 1-57.

*Primary Examiner* — Inder P Mehra
(74) *Attorney, Agent, or Firm* — Finnegan, Henderson, Farabow, Garrett & Dunner LLP (57) ABSTRACT

In LTE Random Access Channel (RACH) mechanism, devices use slotted ALOHA based protocol for RACH message exchange. During these messages exchange, if a device does not get a response from a base-station (BS), the device assumes that it is not able to reach base station due to insufficient transmission power and increases transmit power to reach to the base station. However, at higher density most of requests are lost due to collision. In existing RACH procedure, device unnecessarily ramps power in next RACH process which leads to power wastage in already resource constrained device. When there is failure of reception of RACH process, the present disclosure computes time delays (TD) based on a RSSI value obtained from a message transmitted by the BS, and initiates RACH process accordingly. The embodiments further enable requests transmission from device to BS by ramping power of the devices based on the computed TD.

11 Claims, 4 Drawing Sheets

(51) Int. Cl.
*H04W 52/50* (2009.01)
*H04W 72/04* (2009.01)
*H04W 52/32* (2009.01)
*H04W 88/08* (2009.01)

(52) U.S. Cl.
CPC ....... *H04W 52/50* (2013.01); *H04W 72/0446* (2013.01); *H04W 88/08* (2013.01)

(58) Field of Classification Search
USPC .................................. 455/450, 522; 370/328
See application file for complete search history.

(56) References Cited

U.S. PATENT DOCUMENTS

| | | | |
|---|---|---|---|
| 2010/0232384 A1 | 9/2010 | Farajidana et al. | |
| 2011/0159802 A1* | 6/2011 | Binti Harum | H04B 7/15528 455/7 |
| 2011/0274040 A1* | 11/2011 | Pani | H04W 4/70 370/328 |
| 2013/0035084 A1* | 2/2013 | Song | H04W 74/0833 455/418 |
| 2013/0286959 A1* | 10/2013 | Lou | H04W 72/04 370/329 |
| 2015/0057011 A1 | 2/2015 | Di Girolamo et al. | |
| 2017/0134881 A1* | 5/2017 | Oh | H04W 4/70 |
| 2017/0257780 A1* | 9/2017 | Ryoo | H04W 16/28 |
| 2018/0054837 A1* | 2/2018 | Islam | H04W 74/0833 |

\* cited by examiner

SYSTEMS AND METHODS FOR DELAY BASED POWER RAMPING OF DEVICES

PRIORITY CLAIM

This U.S. patent application claims priority under 35 U.S.C. § 119 to: India Application No. 201721007813, filed on Mar. 6, 2017. The entire contents of the aforementioned application are incorporated herein by reference.

TECHNICAL FIELD

The disclosure herein generally relate to power ramping mechanisms, and, more particularly, to systems and methods for delay based power ramping of devices.

BACKGROUND

With the advent of technology, and particularly, in the world of Internet of Things (IoT), it is desired that every IoT device is able to communicate with the network all the time. Among various technologies to provide network connectivity, Long Term Evolution (LTE) is by far the most ubiquitous technology to provide the coverage for these devices. The IoT devices are inherently the resource constraint devices and efficient communication is one of the primary requirement of these devices. LTE Random Access Channel (RACH) is the initial step for resource access in LTE network. Typically, in existing LTE Random Access Channel (RACH) mechanism, it consists of four (4) message exchanges before the channel resources are granted to the device. During these messages exchange, if a device does not get a response from a base-station, the device assumes that it is not able to reach the base station due to insufficient transmission power and hence increases its transmit power to reach to the base station. The performance of this protocol may work fine for cellular scenarios and may be acceptable as long as user density is low. However, at higher density (e.g., in case of dense IoT deployment) most of the RACH requests are lost due to collision of RACH messages instead of non-reachability to the base station due to insufficient power. With the existing RACH procedure, the device unnecessarily ramps up its power in next RACH attempt. This leads to wastage of the power in an already resource constrained device.

SUMMARY

Embodiments of the present disclosure present technological improvements as solutions to one or more of the above-mentioned technical problems recognized by the inventors in conventional systems. For example, in one aspect, a method for delay based power ramping of devices is provided. The method comprising: transmitting, by one or more devices, a request to a base station, the request comprising a preamble for accessing one or more resources of the base station; upon reception of a message from the base station specific to the request, initiating at a first time interval, over a first RACH transmission channel by the one or more devices (100), a first Random-access channel (RACH) process based on a received signal strength indicator (RSSI) value extracted from the message by configuring power of the one or more devices to a first power level; upon failure of the first RACH process: computing, by the one or more devices (100), one or more time delays specific to power ramping of the one or more devices; initiating, at a second time interval, a second RACH process for the one or more devices based on the one or more computed time delays; and upon initiating the second RACH process, ramping power of the one or more devices (100) to one or more power levels based on the one or more computed time delays.

In an embodiment, the step of ramping, during the second RACH process, power of the one or more devices to one or more power levels based on the one or more computed time delays comprises: configuring the one or more devices (100) to a second power level based on the one or more computed time delays, wherein a request to the base station is transmitted over a second RACH transmission channel based on the second power level.

In an embodiment, the one or more time delays may be computed based on the extracted RSSI value associated with the one or more devices. In an embodiment, the method may further comprise segregating the one or more devices (100) into one or more groups based on the extracted RSSI value associated with the one or more devices; and mapping each of the one or more devices (100) to one or more RACH transmission slots. In an embodiment, each of the one or more devices (100) are power ramped based on the one or more mapped RACH transmission slots.

In another aspect, a device comprising: a memory storing instructions; one or more communication interfaces; and one or more hardware processors coupled to the memory using the one or more communication interfaces, wherein the device is configured by the instructions the one or more hardware processors to: transmit by a request to a base station, the request comprising a preamble for accessing one or more resources of the base station; upon reception of a message from the base station specific to the request, initiate at a first time interval, over a first RACH transmission channel by the device, a first Random-access channel (RACH) process based on a received signal strength indicator (RSSI) value extracted from the message by configuring power of the one or more devices to a first power level, upon failure of the first RACH process: compute one or more time delays specific to power ramping of the device, initiate, at a second time interval, a second RACH process for the device based on the one or more computed time delays, and upon initiating the second RACH process, ramp power of the device to one or more power levels based on the one or more computed time delays. In an embodiment, power of the device is ramped to one or more power levels based on the one or more computed time delays by configuring the device to a second power level based on the one or more computed time delays, and wherein based on the second power level, a request from the device is transmitted to the base station over a second RACH transmission channel.

In an embodiment, the one or more time delays may be computed based on the extracted RSSI value associated with the device. In an embodiment, the device is segregated into a group based on the extracted RSSI value associated thereof, and further mapped to one or more RACH transmission slots, and wherein the one or more RACH transmission slots are indicative of a time instance at which the device is to be ramped with power.

In yet another aspect, one or more non-transitory machine readable information storage mediums comprising one or more instructions is provided. The one or more instructions which when executed by one or more devices causes a method for delay based power ramping of devices. The method comprising: transmitting, by one or more devices, a request to a base station, the request comprising a preamble for accessing one or more resources of the base station; upon reception of a message from the base station specific to the request, initiating at a first time interval, over a first RACH transmission channel by the one or more devices (100), a first Random-access channel (RACH) process based on a received signal strength indicator (RSSI) value extracted from the message by configuring power of the one or more devices to a first power level; upon failure of the first RACH process: computing, by the one or more devices (100), one or more time delays specific to power ramping of the one or more devices; initiating, at a second time interval, a second RACH process for the one or more devices based on the one or more computed time delays; and upon initiating the second RACH process, ramping power of the one or more devices to one or more power levels based on the one or more computed time delays.

In an embodiment, the step of ramping, during the second RACH process, power of the one or more devices to one or more power levels based on the one or more computed time delays comprises: configuring the one or more devices to a second power level based on the one or more computed time delays, wherein a request to the base station is transmitted over a second RACH transmission channel based on the second power level.

In an embodiment, the one or more time delays may be computed based on the extracted RSSI value associated with the one or more devices. In an embodiment, the method may further comprise segregating the one or more devices into one or more groups based on the extracted RSSI value associated with the one or more devices; and mapping each of the one or more devices to one or more RACH transmission slots. In an embodiment, each of the one or more devices are power ramped based on the one or more mapped RACH transmission slots.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

With the advent of Internet of Things (IoT), the number of connected devices has grown exponentially. Mobile operators are attempting to provide network connectivity to these devices using Long Term Evolution (LTE) standards and the existing LTE infrastructure. However, using LTE infrastructure for such a huge number of devices poses significant challenges. Several new issues such as control overhead, energy consumption, scalability and security etc. need to be studied and handled to make LTE a ubiquitous choice for IoT. LTE is designed to provide high data rate access to a relatively smaller number of users/devices normally with long and relatively infrequent data. On the other hand IoT deployment has some very peculiar features such as these devices generate smaller but frequent data for transmission. Moreover, the deployment density of IoT devices is much higher than the traditional cellular users' density. To address some of the issues pertaining to IoT deployments, attempts have been made to support wide area coverage for the IoT. In LTE, the Random Access Channel (RACH) procedure is used to provide uplink synchronization and establish a connection between the device or User Equipment (UE) and the base station or evolved NodeB (eNB). LTE-RACH procedure is a slotted ALOHA based mechanism and the transmitter device can initiates the RACH procedure in any of the RACH slots. One of the most compelling requirement of IoT devices is to have seamless channel access all the time. The energy constraint nature of these devices makes this task of channel access more challenging. In addition, Slotted ALOHA mechanism of the LTE-RACH process brings more difficulty in terms of performance and success rate of the RACH requests. LTE supports both contention-based as well as contention-less RACH procedure. In contention based RACH procedure, multiple devices can contend for a RACH slot which can lead to RACH request collisions when more than one device select the same preamble. However, contention-less procedure is mostly used for delay constraint or real-time applications and is not primarily envisaged for IoT applications. Using RACH, user also obtains resources to transmit Resource Allocation Request to the eNB. If the RACH request is successful, device gets a response from eNB and then follows Radio Resource Control (RRC) request and data transmission procedures respectively. The RACH request may fail because of collision, interference, or unreachability to the eNB. In such a scenario, the device continues to re-initiate the RACH process repeatedly with increasing the transmit power (up to maximum transmit power) till RACH procedure is successful. This leads to wastage of the power in an already resource constrained device. Thus Current LTE RACH mechanisms may not be power efficient for dense deployments because in such scenarios RACH failures are mostly due to request collisions and increasing the transmit power which does not give any significant advantage.

The embodiments of the present disclosure provide systems and methods for delay based power ramping of devices. The embodiments enable computing time delay(s) based on which power ramping of the devices are delayed and determined using a received signal strength indicator (RSSI) value. The embodiments of the present disclosure provide power ramping mechanism(s) that do not ramp the transmit power at every failure rather it randomly delays the power ramping at the device where this delay is based upon the RSSI value at the device.

The embodiments of the present disclosure also provide exemplary experimental data that depict performance of contention-based LTE-RACH procedure for its throughput i.e., the number of successful RACH procedure and the effect of power ramping in case of RACH failures for IoT devices. In ideal situations, the device shall distinguish that whether the RACH loss occurred due to collision or due to unreachability to eNB. However, such a distinction is difficult to implement and may require significant changes and complex closed loop signaling in the LTE design as well as standardization of the same. Hence, the embodiments of the present disclosure systems and methods to improve the efficiency of the RACH procedure by reducing the energy footprint of the devices with minimal changes in the LTE-RACH procedure.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

Figure 1:
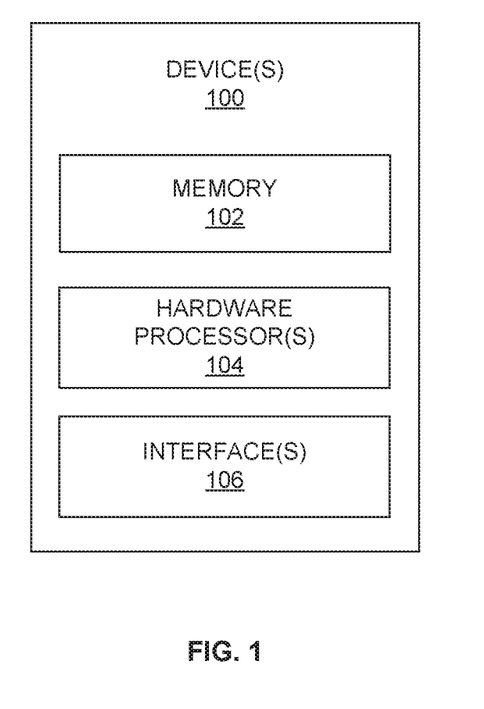
FIG. 1 illustrates an exemplary block diagram of one or more devices for which power ramping is performed based on one or more computed time delays in accordance with an embodiment of the present disclosure.

FIG. 1 illustrates an exemplary block diagram of one or more devices 100 for which power ramping is performed based on one or more computed time delays in accordance with an embodiment of the present disclosure. In an embodiment, the device 100 includes one or more processors 104, communication interface device(s) or input/output (I/O) interface(s) 106, and one or more data storage devices or memory 102 operatively coupled to the one or more processors 104. In an embodiment, the one or more devices are Long Term Evolution (LTE) devices (e.g., cellular devices). The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the device 100 can be stored in the memory 102. The memory 102 may further store information pertaining to communication between devices, and a base station (not shown in FIG. 1). In an example embodiment, the information comprises but is not limited to system information block 2—SIB2 (or message(s)) received from one or more base stations), RSSI value, computed time delays, RACH transmission slots at which power ramping is performed, RSSI threshold(s), mapping details pertaining to device(s) and RACH transmission slot(s), group details wherein device being segregated into a particular group, and the like.

Figure 2:
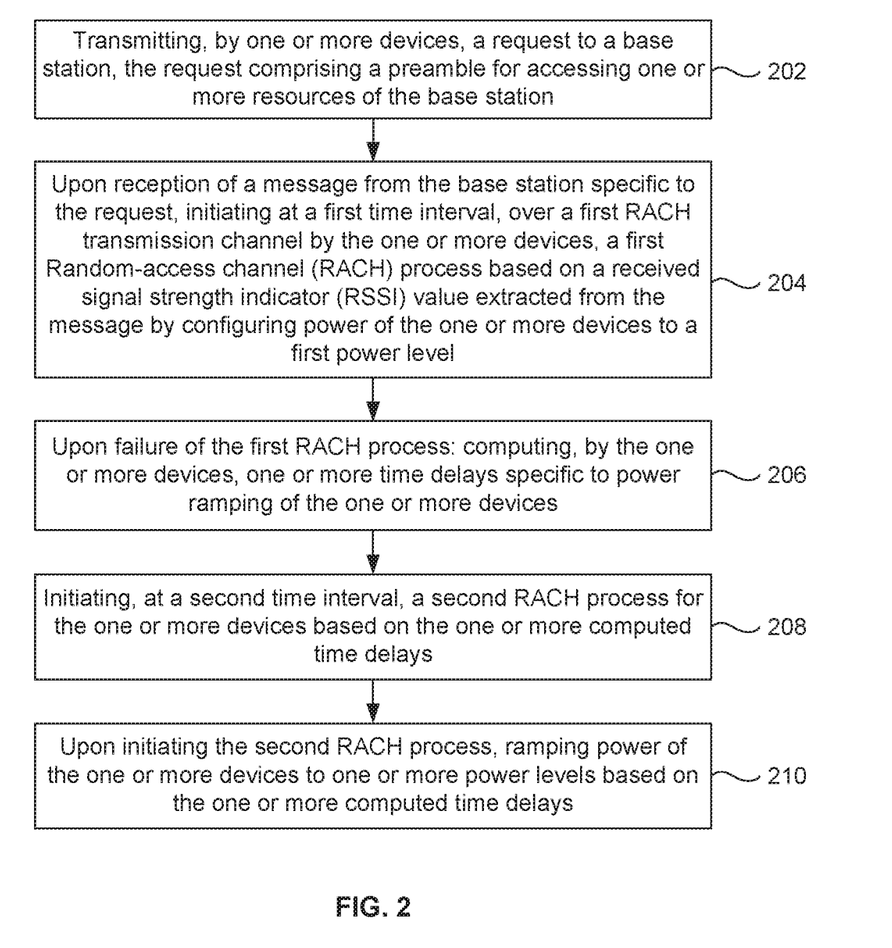
FIG. 2 illustrates an exemplary flow diagram of a method for delay based power ramping of the one or more devices of FIG. 1 in accordance with an embodiment of the present disclosure.

FIG. 2, with reference to FIG. 1, illustrates an exemplary flow diagram of a method for delay based power ramping of the one or more devices 100 of FIG. 1 in accordance with an embodiment of the present disclosure. In an embodiment, the device(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to the components of the device 100 as depicted in FIG. 1, and the flow diagram. In an embodiment of the present disclosure, when the device 100 is configured by the instructions via the one or more hardware processors 104, the device performs one or more methodologies described herein. In an embodiment of the present disclosure, at step 202, one or more devices 100 (associated with one or more users) transmit a request to a base station. In an embodiment, the request may comprise a preamble for accessing one or more resources of the base station. In response to transmitting the request to the base station, the base station may transmit a message (e.g., system information block) that includes a received signal strength indicator (RSSI) value associated with each of the one or more devices 100. In an embodiment of the present disclosure, at step 204, upon reception of a message from the base station specific to the request, the one or more devices 100 initiate at a first time interval, over a first RACH transmission channel, a first Random-access channel (RACH) process based on a received signal strength indicator (RSSI) value extracted from the message by configuring power of the one or more devices 100 to a first power level. In an embodiment of the present disclosure, the one or more devices 100 extract RSSI value from corresponding received message. For example, Let 'N' be number of devices which are contending simultaneously for the channel access. Each device may receive a RSSI value associated with them from the base station in response to transmitting the request. For example, Device 1 may receive a RSSI value '−10', Device 2 may receive a RSSI value '−47', Device 3 may receive a RSSI value '−62', and Device 4 may receive a RSSI value '−84' Device 5 may receive a RSSI value '−105' and Device 'n' may receive a RSSI value '−x'. The RSSI value is a value (e.g., indicative of quality of the signal associated with the request (transmitted by the devices 100) measured by the base station.

During the first RACH process, the one or more devices 100 transmit further requests (or messages) to the base station. At an initial stage, based on the received (or extracted) RSSI value, the devices 100 may transmit through a RACH slot. The one or more devices 100 may await for response from the base station for a pre-determined time interval as per the 3GPP LTE standard release 'x', wherein release 'x' is release 10 or later standard). When there is no responses to the further requests transmitted even after an expiry of the pre-determined time interval, the one or more devices 100 may be prompted with an indication of failure of the first RACH process. In some scenarios, the one or more devices 100 may presume that there is a failure in the first RACH process reception after the expiry of the predetermined time interval. In an embodiment of the present disclosure, probability of failure of reception of RACH process may be based on an inverse of RSSI value.

In an embodiment of the present disclosure, at step 206, upon failure of the first RACH process, the one or more devices 100 compute one or more time delays specific to power ramping of the one or more devices 100. The one or more time delays are computed based on the extracted RSSI value from the message associated with (or transmitted to each of) the one or more devices 100.

In an embodiment of the present disclosure, at step 208, the one or more devices 100 initiate, at a second time interval, a second RACH process based on the one or more computed time delays. In an embodiment of the present disclosure, initiating the second RACH process may comprise terminating the first RACH process.

In an embodiment of the present disclosure, at step 210, upon initiating the second RACH process, power of the one or more devices 100 is (or may be) ramped to one or more power levels based on the one or more computed time delays. In an embodiment of the present disclosure, the one or more devices 100 are ramped to one or more power levels based on the one or more computed time delays by configuring the one or more devices 100 to a second power level based on the one or more computed time delays, and then further transmitting, based on the second power level, a request to the base station on a second RACH transmission channel. The above steps 206, 208 and 210 are better understood by way of examples, illustrated below:

Now that the one or more devices 100 know of a failure of the first RACH process, the devices 100 may delay the power ramping process. For example, if Device 1 was initially ramping power at every RACH slot (by setting to a first power level say 1.0), it may now additionally delay the power ramping based on the RSSI value (and/or based on the allocated RACH slots) say to an alternative RACH slot. Therefore, upon the initiating the second RACH process by the one or more devices 100, each of the devices may power ramp themselves to a second power level, (determined as per the 3GPP LTE release 'x', wherein release 'x' is release 10 or later standard) by delaying to further time interval. For example, if there are 4 RACH slots allocated to Device 1, Device 1 may delay power ramping by one RACH slot. Based on the response to request(s) transmitted for the $2^{nd}$ RACH slot, Device 1 may continue to power ramp for a subsequent RACH slot (say $3^{rd}$ RACH slot). In some scenarios, on the basis of the response (positive or negative) from the base station, the power ramping of devices 100 may vary. In other words, if a response for a given RACH slot is received from the base station on time, the device may (or may not) power ramp for the next RACH slot. For example, if a response is received by the Device 1 during the RACH process, while the power ramping is performed in the 2nd RACH slot, the Device 1 may (or may skip) perform power ramping at $3^{rd}$ RACH slot. Similarly, the Device 1 may skip perform power ramping at $3^{rd}$ RACH slot, but rather power ramp at $4^{th}$ RACH slot based on the responses received from the base station. Similarly, other devices (Device 2, Device 3, Device 4, Device 5, and Device 'n') may perform power ramping at one or more allocated RACH slots accordingly. In an embodiment of the present disclosure, devices with larger RSSI value may be delayed for longer time for power ramping. This may be done because the probability of this device not reaching to the base station (eNB) due to power shortage is smaller.

Each of the one or more devices 100 may be segregated into one or more groups based on the extracted RSSI value associated thereof. For example, based on the deployment of the devices 100, and their associated RSSI value(s), the devices 100 may be segregated into one or more groups. For instance, criteria may include (i) RSSI values of devices that come under a first RSSI threshold are categorized under Group 1, and (i) RSSI values of devices that come under a second RSSI threshold are categorized under Group 2. The first and second RSSI threshold may comprise threshold range, in an example embodiment. For instance, the first RSSI threshold may be between −120 to −71, and the second RSSI threshold may be between −70 to −0. RSSI of devices that are in range [−120 to −70], devices may be categorized under Group 1, and RSSI of devices that are in the range [−70 to 0] may be categorized under Group 2. In the present disclosure, the devices Device 1, Device 2, and Device 3 are categorized under Group 2, and the devices Device 4, and Device 5 are categorized under Group 1 based on the above criteria.

Upon segregation, the grouped devices 100 may be mapped to one or more RACH transmission slots. The one or more RACH transmission slots comprise information pertaining to a time instance at which power of the one or more devices 100 may be ramped. In other words, the one or more RACH transmission slots are indicative of a time instance at which power of the one or more devices 100 may be ramped and request(s) transmission are initiated accordingly. In other words, devices in Group 1 may select (or may be allocated) RACH slots between say 1 to 8 and can delay their power ramping for that number of slots. For example, Device 4 from Group 1 selects a random number as 5 and may only power ramp after 5 RACH slots. Similarly, devices from Group 2 may select (or may be allocated) RACH slots between 9 to 16 and can delay their power ramping by that number of slots. The segregation of the one or more devices 100 into one or more groups may comprise performing a comparison of each of the extracted RSSI value of the one or more devices 100 with one or more pre-defined thresholds (e.g., one or more RSSI thresholds—the first RSSI threshold, and the second RSSI threshold). In an embodiment of the present disclosure, the RSSI thresholds are pre-defined (and/or user configurable) based on deployment type (e.g., says $1^{st}$ floor in an office building) and may vary accordingly. The segregation of the devices 100 into one or more groups and mapping them to one or more RACH slots, and enabling power ramping at desired RACH slots may prevent requests collisions, and ensure efficient and improved communication exchange between devices and base station.

In an embodiment of the present disclosure, the device 100 may comprise one or more modules (not shown in FIGS. 1-2) stored in the memory 102. The one or more modules may comprise but are not limited to, (i) a RACH process module that is configured to initiate and terminate one or more RACH processes, (ii) a failure indication module that is configured to determine (or compute) probability of failure of one or more RACH processes based on extracted RSSI value associated with the device 100 thereof, (iii) a time delay computation module that is configured to compute one or more time delays specific to power ramping of the device 100, and (iv) a power adjustment module that is configured to set power of the device to one or more power levels for further transmission of requests. In an embodiment of the present disclosure, the RACH process module, the failure indication module, the time delay computation module, and the power adjustment module are implemented as at least one of a logically self-contained part of a software program, a self-contained hardware component, and/or, a self-contained hardware component with a logically self-contained part of a software program embedded into each of the hardware component that when executed perform the above method described herein.

Below is an exemplary power ramping procedure that may be implemented by the device 100:

After receiving a message from the base station, each of the one or more devices 100 starts RACH process, wherein one or more groups (M1, M2, . . . Mn) may be defined for segregation of the one or more devices 100.

For each transmitter device, x perform:

```
    K_x = 1
    Initiate RACH process with transmit power P_rach
    if RACH success then
        EXIT
    else
        {RACH fails}
        {determining the deferred power ramping slot for the transmitter
        device x]
        if RSSI_x < RSSI_th1 then
            K_x^d = random (1, K_max/M)
        else if RSSI_x < RSSI_th2 then
            K_x^d = random ((K_max/M) + 1, 2 * K_max/M)
        ...
        else
            K_x^d = random ((M − 1) * (K_max/M) + 1, K_max)
            end if
    end if
    K_x = K_x + 1
    while K_x <= K_max do
        if K_x <= K_x^d do
            Initiate RACH process with transmit power, P_rach
        else
            P_rach = P_rach + power RampingStep
            Initiate RACH process with transmit power, P_rach
        end if
        if RACH success then
            EXIT
        else
            {RACH fails}
            K_x = K_x + 1
            CONTINUE
        end if
    end while
end for
```

$K_x$ denotes a RACH attempting process for the device x. $K_{max}$ denotes maximum number of times a device can attempt for RACH. $RSSI_{th1}$ to $RSSI_{thm}$ denote M threshold RSSI values to determine the slot subgroup (or slot group) of x.

Figure 3:
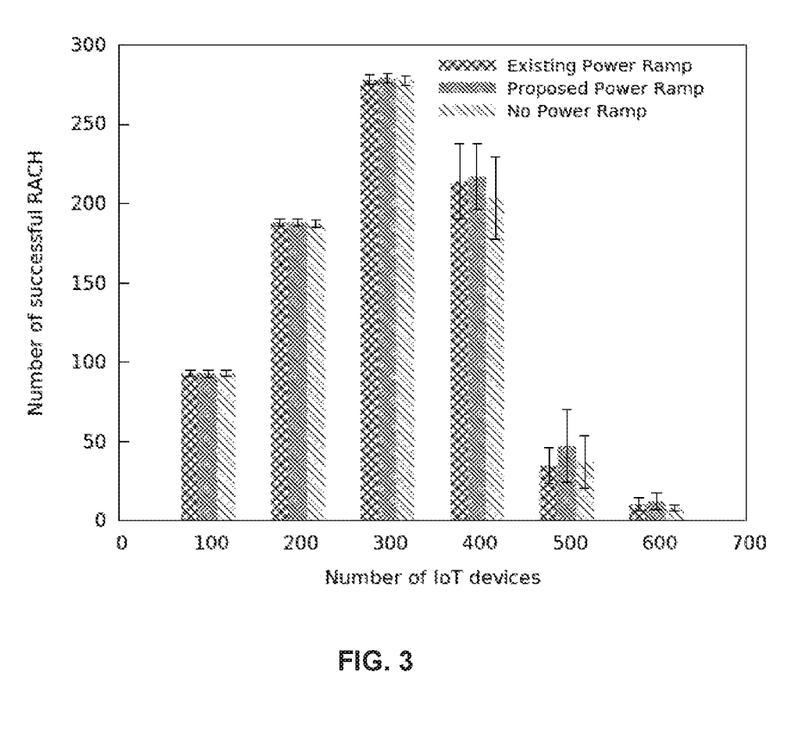
FIG. 3 illustrates a graphical representation depicting success rate of power ramping of devices in accordance to example embodiment of the present disclosure.

FIG. 3, with reference to FIGS. 1-2, illustrates a graphical representation depicting success rate of power ramping of devices in accordance to example embodiment of the present disclosure. More specifically, FIG. 3 depicts comparison of success rate of delayed power ramping of IoT devices of proposed technique by the embodiments of the present disclosure versus existing power ramping, and no power ramping. As can be depicted in FIG. 3, the number of successes with delayed power ramping is always at least equal to the existing power ramping scenario. This is because power is selectively ramped only for the contending devices which have smaller RSSI value either due to distance or bad channel conditions. This provides an opportunity at the base station (e.g., eNB) to detect the collision due to capture effect. With increasing number of device density, larger number of devices are placed farther from the eNB. Hence, this proposed technique provides better throughput as well as better utilization of the power at the device in turn increasing the battery life time of the devices.

Another observation is that the number of RACH success improves with 10 milliseconds backoff at higher densities. This can be explained by the simple fact that by backing off the RACH attempts randomly in time, the RACH requests are further distributed over time scale. This phenomenon further reduces the chances of collision and in turn improves the number of RACH success.

Figure 4:
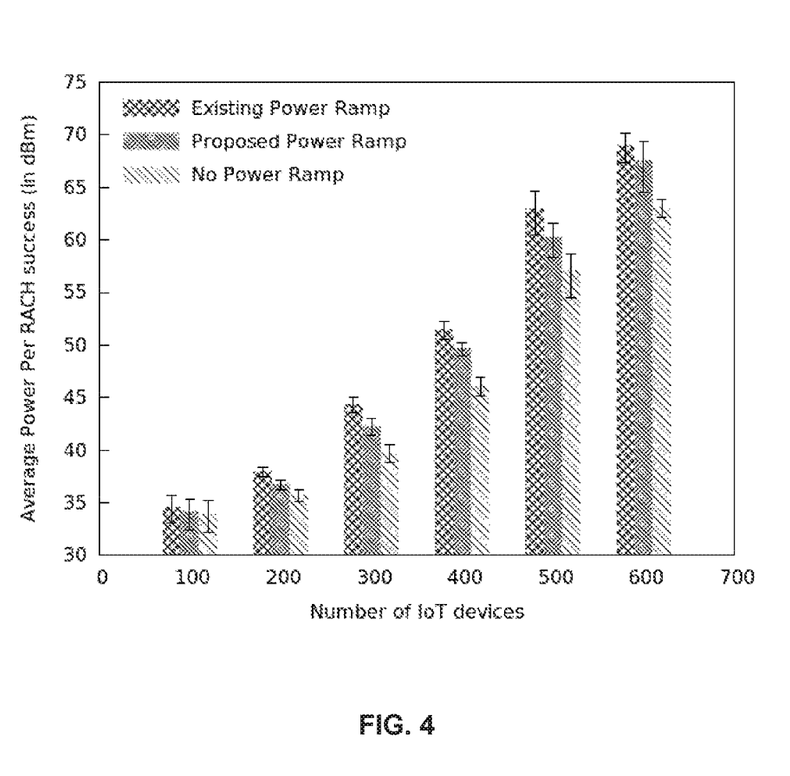
FIG. 4 illustrates a graphical representation depicting average power consumed per RACH success for devices in accordance to example embodiment of the present disclosure.

FIG. 4, with reference to FIGS. 1-3, illustrates a graphical representation depicting average power consumed per RACH success for devices in accordance to example embodiment of the present disclosure. More specifically, FIG. 4 depicts comparison of average power consumed per RACH success for IoT devices of proposed technique by the embodiments of the present disclosure versus existing power ramping, and no power ramping. As can be depicted from FIGS. 3-4, the performance of the existing LTE RACH process may not be power efficient for dense IoT deployment because it does not distinguish the collision losses from the unreachability to the eNB due to insufficient transmit power.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method, comprising:
    transmitting, by one or more IoT (Internet of Things) devices, a request to a base station, the request comprising a preamble for accessing one or more resources of the base station;
    upon reception of a message including a received signal strength indicator (RSSI) value for configuring power of the one or more IoT devices to a first power level from the base station specific to the request, initiating at a first time interval, over a first Random-access channel (RACH) transmission channel by the one or more IoT devices, a first Random-access channel (RACH) process based on the RSSI value extracted from the message by configuring power of the one or more IoT devices to the first power level;
    upon failure of the first RACH process:
        computing, by the one or more IoT devices, one or more time delays specific to power ramping of the one or more IoT devices;
        initiating, at a second time interval, a second RACH process for the one or more IoT devices based on the one or more computed time delays; and
        upon initiating the second RACH process, ramping power of the one or more IoT devices to one or more power levels based on the one or more computed time delays and independent from number of RACH process transmission, wherein the one or more time delays are computed based on the extracted RSSI value associated with the one or more IoT devices.

2. The method of claim 1, wherein the ramping, during the second RACH process, the power of the one or more IoT devices to the one or more power levels based on the one or more computed time delays comprises:
    configuring the one or more IoT devices to a second power level based on the one or more computed time delays, wherein a request to the base station is transmitted over a second RACH transmission channel based on the second power level.

3. The method of claim 1, further comprising:
    segregating the one or more IoT devices into one or more groups based on the extracted RSSI value associated with the one or more IoT devices; and
    mapping each of the one or more IoT devices to one or more RACH transmission slots.

4. The method of claim 3, wherein each of the one or more IoT devices are power ramped based on the one or more mapped RACH transmission slots.

5. A IoT device comprising:
    a memory storing instructions;
    one or more communication interfaces; and
    one or more hardware processors coupled to the memory using the one or more communication interfaces, wherein the IoT device is configured by the instructions the one or more hardware processors to:
        transmit a request to a base station, the request comprising a preamble for accessing one or more resources of the base station;
        upon reception of a message including a received signal strength indicator (RSSI) value for configuring power of the IoT device to a first power level from the base station specific to the request, initiate at a first time interval, over a first Random-access channel (RACH) transmission channel by the IoT device, a first Random-access channel (RACH) process based on the RSSI value extracted from the message by configuring power of the IoT devices to the first power level;
        upon failure of the first RACH process:
            compute one or more time delays specific to power ramping of the IoT device;
            initiate, at a second time interval, a second RACH process for the IoT device based on the one or more computed time delays; and
            upon initiating the second RACH process, ramp power of the IoT device to one or more power levels based on the one or more computed time delays and independent from number of RACH process transmission, wherein the one or more time delays are computed based on the extracted RSSI value associated with the one or more IoT devices.

6. The IoT device of claim 5, wherein the power of the IoT device is ramped to one or more power levels based on the one or more computed time delays by configuring the IoT device to a second power level based on the one or more computed time delays, and wherein based on the second power level, a request from the IoT device is transmitted to the base station over a second RACH transmission channel.

7. The IoT device of claim 5, wherein the IoT device is segregated into a group based on the extracted RSSI value associated thereof, and further mapped to one or more RACH transmission slots.

8. The device of claim 7, wherein the IoT device is power ramped based on the one or more mapped RACH transmission slots.

9. One or more non-transitory machine readable information storage mediums comprising one or more instructions which when executed by one or more IoT devices causes a method for delay based power ramping of IoT devices, the method comprising:
    transmitting, by the one or more IoT devices, a request to a base station, the request comprising a preamble for accessing one or more resources of the base station;
    upon reception of a message including a received signal strength indicator (RSSI) value for configuring power of the one or more IoT devices to a first power level from the base station specific to the request, initiating at a first time interval, over a first Random-access channel (RACH) transmission channel by the one or more IoT devices, a first Random-access channel (RACH) process based on the RSSI value extracted from the message by configuring power of the one or more IoT devices to the first power level;
    upon failure of the first RACH process:
    computing, by the one or more IoT devices, one or more time delays specific to power ramping of the one or more IoT devices;
    initiating, at a second time interval, a second RACH process for the one or more IoT devices based on the one or more computed time delays; and
    upon initiating the second RACH process, ramping power of the one or more IoT devices to one or more power levels based on the one or more computed time delays and independent from number of RACH process transmission, wherein the one or more time delays are computed based on the extracted RSSI value associated with the one or more IoT devices.

10. The one or more non-transitory machine readable information storage mediums of claim 9, wherein the step of ramping, during the second RACH process, the power of the one or more IoT devices to the one or more power levels based on the one or more computed time delays comprises:
    configuring the one or more IoT devices to a second power level based on the one or more computed time delays, wherein a request to the base station is transmitted over a second RACH transmission channel based on the second power level.

11. The one or more non-transitory machine readable information storage mediums of claim 9, wherein the instructions further comprise:
    segregating the one or more IoT devices into one or more groups based on the extracted RSSI value associated with the one or more IoT devices; and
    mapping each of the one or more IoT devices to one or more RACH transmission slots, wherein each of the one or more IoT devices are power ramped based on the one or more mapped RACH transmission slots.

* * * * *